United States Patent

[11] 3,622,180

[72] Inventor Robert F. Humlong
Maysville, Ky.
[21] Appl. No. 875,780
[22] Filed Nov. 12, 1969
[45] Patented Nov. 23, 1971
[73] Assignee Wald Manufacturing Company,
Incorporated
Mayville, Ky.

[54] BICYCLE KICKSTAND
13 Claims, 8 Drawing Figs.
[52] U.S. Cl. ............................................................ 280/301
[51] Int. Cl. ............................................................ B62h 1/02
[50] Field of Search............................................... 280/301

[56] References Cited
UNITED STATES PATENTS
2,615,729 10/1952 Atwood et al. ............... 280/301
2,735,694 2/1956 Atwood et al. ............... 280/301
FOREIGN PATENTS
245,869 11/1946 Switzerland.................. 280/301
243,101 1/1965 Austria......................... 280/301
197,463 4/1938 Switzerland.................. 280/301

Primary Examiner—Benjamin Hersh
Assistant Examiner—John F. Silverstrim
Attorney—J. Warren Kinney, Jr.

ABSTRACT: The kickstand incorporates a supporting leg having a journal portion pressure formed in a single operation to provide flat seat faces yieldingly engageable by a flat face of a detent member, to provide a superior snap action movement of the leg between operative and inoperative positions.

PATENTED NOV 23 1971          3,622,180
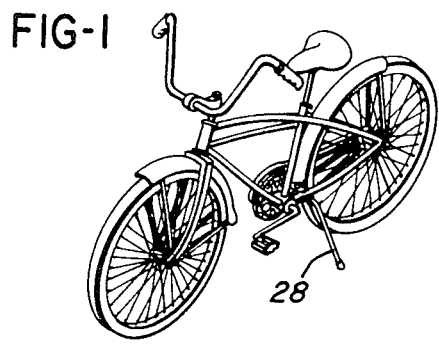
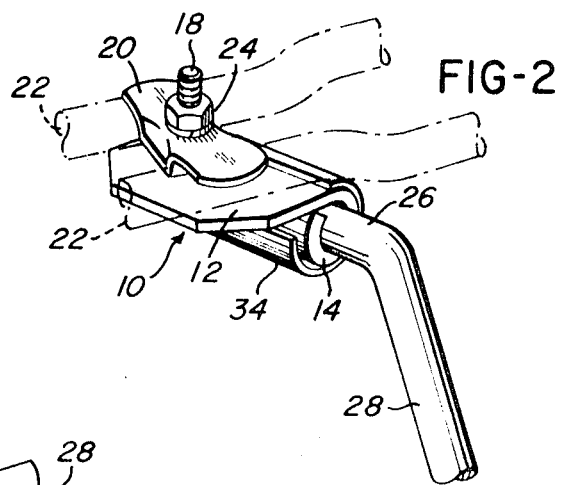
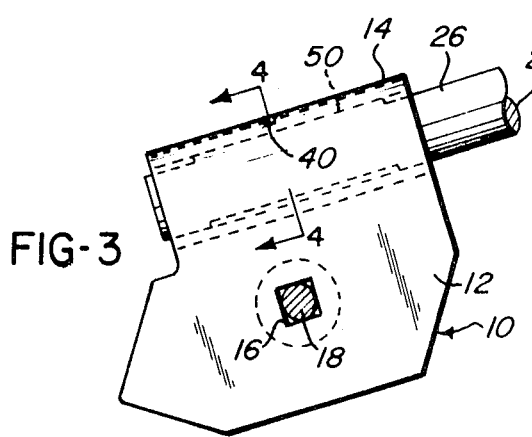
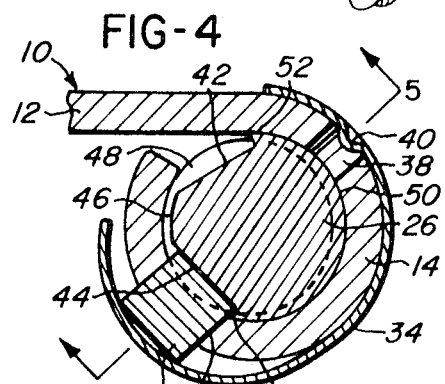
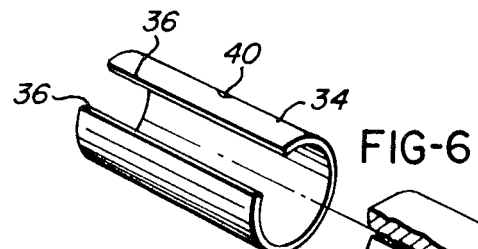
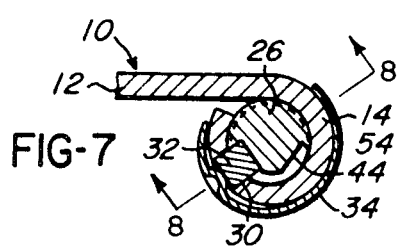
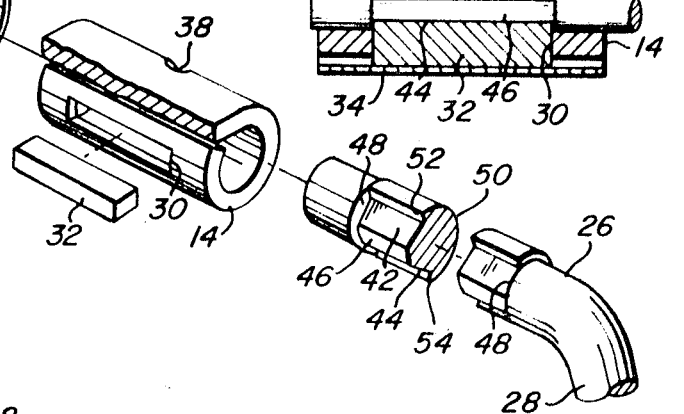
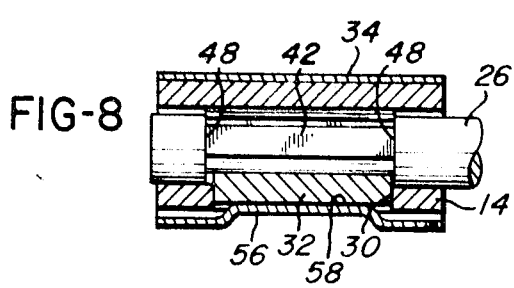
INVENTOR
ROBERT F. HUMLONG
BY J. Warren Kinney Jr.
ATTORNEY

BICYCLE KICKSTAND

This invention relates to a bicycle kickstand, for supporting a bicycle in an upright or standing position when not in use.

Bicycle kickstands of the single leg type are in common usage, and have become very popular in use upon most types of bicycles, motorcycles, motorized bicycles and the like. Single leg kickstands by reason of their unfavorable location upon the vehicle, and the fact that they are foot operated, are subject to much hard usage and abuse.

In the preferred form of kickstand, the supporting leg or prop is movable with a snap action or spring detent force, between an inoperative or raised position in substantial parallelism with the rearwardly extended rear wheel fork, and an operative or lowered position at which it supports the vehicle in an upright or standing position. The wear that eventually disables a kickstand occurs in the region of the spring detent means, and very little of a permanent nature can be done to restore it to a satisfactorily serviceable condition. It is therefore customary to replace the worn kickstand in its entirety with a new one.

It is an object of the present invention, therefore, to provide an improved kickstand construction which will most effectively withstand destructive wear, so that the service life of the kickstand is desirably prolonged.

Another object of the invention is to enhance the serviceability of a kickstand while at the same time reducing the manufacturing cost thereof.

Another object of the invention is to reduce to a minimum the number of constituent parts employed in a highly serviceable kickstand.

The foregoing and other objects are attained by the means described herein and illustrated upon the accompanying drawing, in which:

FIG. 1 is a perspective view of a bicycle embodying the improved kickstand of the present invention.

FIG. 2 is a perspective view of the kickstand shown applied to the rearwardly extended rear wheel fork of a bicycle frame.

FIG. 3 is a top plan view of the kickstand-mounting bracket, the securing bolt being shown in cross section.

FIG. 4 is an enlarged cross section taken on line 4—4 of FIG. 3.

FIG. 5 is a cross section on a reduced scale, taken on line 5—5 of FIG. 4.

FIG. 6 is an exploded perspective view of the kickstand illustrated by FIGS. 1 through 5.

FIG. 7 is a view similar to FIG. 4, showing a modification.

FIG. 8 is a cross section taken on line 8—8 of FIG. 7.

The kickstand of this invention comprises a rigid metallic bracket 10 having a generally flat planar portion 12 bent along one side edge thereof to provide a substantially cylindrical elongate barrel or bearing member 14. Portion 12 is pierced at 16 to accommodate the shank of a mounting bolt or other suitable fastener 18 which passes through an apertured clamp plate 20. Planar portion 12 of the bracket may underlie the spaced bars 22, 22 of the bicycle frame rear fork, while the clamp plate 20 overlying said bars, clamps the bracket firmly against the fork bars incident to tightening of the nut 24 on bolt 18.

Clamp plate 20 may be suitably shaped to embrace the bars 22 so as to enhance the grip thereof upon the bars, and prevent rotation of the clamp plate as nut 24 is tightened or loosened. The clamp bolt may be prevented from rotating by means of the usual flats on the bolt entering the square hole 16 of the bracket. The clamp bolt extends between the bars 22, 22.

The barrel or bearing member 14 is adapted to support for rotation the journal end portion 26 of the kickstand leg or prop 28, the leg or prop being angularly inclined to the journal end portion as an integral part thereof. The lower end of the leg rests upon the ground or other supporting surface, when operative to support the bicycle. When elevated to the inoperative position, the leg rests in substantial parallelism with the plane of the fork bars 22.

It is noted that barrel 14 is provided with an elongate slot 30 for receiving loosely therein an elongate key or detent element 32 which is considerably thicker than the thickness of the barrel wall which contains the slot. The key or element 32 is yieldingly projected toward the axis of barrel 14 by the action of a resilient metal sleeve 34 which yieldingly hugs the outer wall of the barrel and extends about the barrel a substantial distance, or a distance greater than half the circumference of the barrel. In the preferred construction, the length of the resilient sleeve approximates the length of barrel 14. Preferably also, the key 32 is substantially coextensive with slot 30.

As is best illustrated by FIG. 6, the resilient metal sleeve 34 is a part cylinder when relaxed, and has spaced parallel longitudinal edges 36, 36. It may be formed of spring steel or other suitable metal characterized by a powerful resiliency resisting axial expansion of the sleeve, for instance as stressed in FIG. 4. It will readily be understood with reference to FIG. 4, that the contractile force of spring sleeve 34 constantly urges the key or detent element 32 forcefully against journal 26.

Means may be provided to preclude inadvertent bodily displacement of sleeve 34 from a normal position upon barrel 14. Such means according to FIGS. 1 through 6, may comprise a hole or depression 38 formed in the material of the barrel, and into which hole or depression may extend a retaining pimple or inner projection 40 formed in the cylindrical wall of sleeve 34. Other forms of retaining means for the spring sleeve may be employed, as desired.

Journal 26 is initially round bar stock like the leg or prop 28. The journal, however, is subjected to a cold-forming operation which displaces metal to provide a pair of convergent flat areas or seats 42 and 44 (FIG. 4) meeting at a blunt apex or ridge 46. The flats or seats 42, 44, as well as the apex 46, are displaced from the original cylindrical shape of the journal as plainly indicated upon FIG. 4, thereby to provide automatically the shoulders 48, 48, at opposite ends of the flats or seats. The distance between the shoulders 48, 48 approximates the length of key or detent 32.

Also displaced from the original cylindrical shape of journal 26, is the part cylindrical hump 50 which reaches from one seat 42 to the other seat 44. The hump 50, being formed concurrently with displacement of metal from the seats or flats, is coextensive in length with the length of the seats or flats, or the distance between shoulders 48, 48. The hump 50 becomes a bearing surface of the journal in contact with barrel 14 when assembled, according to FIG. 4.

As clearly shown by FIG. 4, the spring sleeve or member 34 forcefully projects the key or detent member 32 flatwise against the flat seat 44, thereby to firmly though yieldingly latch the journal 26 against rotation within the barrel 14. With sufficient force applied to rotate the journal 26 in counterclockwise direction, the apex 46 of journal 26 will first displace the detent 32 outwardly against spring sleeve 34, and upon further rotation thereof the flat or seat 42 will move into position to flatly engage the flat inner face of detent or key 32. With the seat 42 engaging the detent, aided by the contractile force of spring sleeve 34, the journal 26 will be firmly though yieldingly held in the new position, which will be the inoperative or elevated position of the kickstand. When the kickstand is lowered to the operative position of FIG. 2, the detent will be in engagement with flat 42.

It should be noted that displacement of metal for forming the flats 42 and 44 results also in the formation of elongate narrow flat shoulders or ledges 52 and 54, which serve as stops or abutments against which the detent 32 may impinge, so as to limit rotational movement of journal 26 in both the clockwise and the counterclockwise directions.

Noteworthy also is the fact that the spring sleeve 34 enforces a snap action disposition of the detent to home positions against the stops 52 and 54, as the case may be, depending upon whether the kickstand is to be elevated or lowered. Due to the fact that the seats 42 and 44 are flat, and the engaging face of the detent or key also is flat, a very pronounced snap action disposition of the kickstand to operative and inoperative positions is achieved, accompanied by a firm resistance opposing inadvertent displacement of the kickstand leg from either of said positions.

The shoulders 48, 48 present simple stops or abutments for opposite ends of the key or detent 32 so long as the spring sleeve 34 is in place, and this simplifies retention of journal 26 by the barrel 14. The construction not only simplifies and expedites assembly of the kickstand, but in addition, reduces the number of constituent parts. The flats or seats 42, 44, and the blunt apex 46, as well as the flat engaging face of detent 32, are highly resistant to wear since no destructive shear forces are generated incident to movement of the kickstand between the operative and inoperative positions.

The modified construction, FIGS. 7 and 8, eliminates the sleeve-retaining means 38, 40 of FIGS. 4 and 5, and substitutes a simplified retaining means in the region of detent or key member 32. In this modification, the detent or key member is reduced in thickness so that its outer face 56 cannot project outwardly beyond the limits of barrel 14, through the elongate key slot 30. This construction provides an elongate key depression into which may project an elongate internal rib 58 formed in the material of spring sleeve 34. Thus, the internal rib 58 performs the dual function of yieldingly projecting the key or detent against the flats of the journal, while precluding rotational and longitudinal accidental displacement of the spring sleeve 34 relative to barrel 14. In all other respects, the device of FIGS. 7 and 8 is similar to the device of FIGS. 1 through 6.

What is claimed is:

1. A kickstand comprising in combination: a rigid bracket including a cylindrical elongate barrel having opposite ends, said barrel having an elongate slot formed therein substantially parallel to the barrel axis; a supporting leg having an elongate journal portion disposed at an angle to the leg; an intermediate portion in the journal portion supported for rotational movement within the barrel; an elongate detent member loosely supported in the slot of the barrel for bodily movement toward and from the barrel axis, said detent member having a flat planar inner face exposed to the journal portion aforesaid; a pair of convergent planar seat areas on the intermediate portion of said journal portion, said seat areas meeting one another at a blunt apex; resilient means constantly yieldingly projecting the detent member toward the journal portion of the supporting leg with the flat planar inner face of the detent member in flatwise contact upon one of the planar seat areas of the journal portion aforesaid; and ledge means on the journal portion adjacent opposite sides of the planar seat areas and engageable by the detent member for limiting rotational movement of said journal portion in opposite directions within the barrel.

2. The combination as defined by claim 1, wherein said resilient means for projecting the detent member is in the form of a part cylindrical spring metal sleeve embracing the barrel of the bracket and contacting the detent member with a constant yielding force.

3. The combination as defined by claim 1, wherein the ledge means comprise outwardly extending ledges on a longitudinal edge of the planar seat areas opposite to the blunt apex.

4. The combination as defined by claim 3, wherein the intermediate portion has a hump opposite to the planar seat areas extending outwardly beyond the journal portion and engaging the interior wall of the barrel.

5. The combination as defined by claim 4, wherein shoulders are provided at opposite ends of the planar seat areas, the shoulders being engaged by the ends of the detent member to limit endwise shifting of the intermediate portion within the barrel.

6. The combination as defined by claim 3, wherein shoulders are provided at opposite ends of the planar seat areas, the shoulders being engaged by the ends of the detent member to limit endwise shifting of the intermediate portion within the barrel.

7. The combination as defined by claim 2, wherein is included cooperative means on the barrel and on the spring metal sleeve, for precluding axial shifting of said sleeve relative to the barrel.

8. The combination as defined by claim 7, wherein the cooperative means aforesaid includes the elongate slot of the barrel.

9. The combination as defined by claim 7, wherein the cooperative means aforesaid includes an internal rib on the spring metal sleeve extended into the elongate slot of the barrel and against an edge of the detent means.

10. The combination as defined by claim 1, wherein said resilient means for projecting the detent member is in the form of a part cylindrical spring metal sleeve embracing the barrel and contacting the detent member with a constant yielding force; and wherein said rotation-limiting means includes a pair of elongate ledges each one defining one of the planar seat areas, and each of said ledges being in position to abut the detent member incident to rotation of the journal portion in opposite directions; said combination including also a pair of spaced shoulders at opposite ends of said planar seat areas, to abut opposite ends of said detent member for limiting endwise shifting of the journal portion within the barrel of the bracket.

11. The combination as defined by claim 10, wherein is included cooperative means on the barrel and on the spring metal sleeve, for precluding axial shifting of said sleeve relative to the barrel.

12. The combination as defined by claim 11, wherein said cooperative means includes the elongate slot of the barrel.

13. The combination as defined by claim 11, wherein the cooperative means aforesaid includes an internal rib on the spring metal sleeve overlying and yieldingly contacting the detent means, to urge said detent means toward the journal portion of the supporting leg.

* * * * *